(12) United States Patent
Chang

(10) Patent No.: US 7,076,646 B2
(45) Date of Patent: Jul. 11, 2006

(54) SELECTIVE QUICK BOOTING A PARTIAL SET OF DEVICES CORRESPONDING TO AN EVENT CODE VIA THE BIOS

(75) Inventor: Li-Jen Chang, Taoyuan (TW)

(73) Assignee: Mitac Technology Corp., Hsin-Chu Hsien (TW)

( * ) Notice: Subject to any disclaimer, the term of this patent is extended or adjusted under 35 U.S.C. 154(b) by 0 days.

(21) Appl. No.: 10/702,020

(22) Filed: Nov. 5, 2003

(65) Prior Publication Data

US 2005/0097309 A1 May 5, 2005

(51) Int. Cl.
*G06F 9/00* (2006.01)
(52) U.S. Cl. .......................... 713/1; 713/300
(58) Field of Classification Search ............ 713/1, 713/300
See application file for complete search history.

(56) References Cited

U.S. PATENT DOCUMENTS

| | | | | |
|---|---|---|---|---|
| 5,560,024 A | * | 9/1996 | Harper et al. | 713/322 |
| 5,793,980 A | * | 8/1998 | Glaser et al. | 709/231 |
| 5,881,318 A | * | 3/1999 | Liebenow | 710/67 |
| 5,978,923 A | * | 11/1999 | Kou | 713/323 |
| 6,006,285 A | * | 12/1999 | Jacobs et al. | 710/14 |
| 6,414,675 B1 | * | 7/2002 | Shen | 345/211 |
| 6,654,827 B1 | * | 11/2003 | Zhang et al. | 710/62 |
| 2003/0182546 A1 | * | 9/2003 | Suzuki et al. | 713/1 |

* cited by examiner

*Primary Examiner*—Lynne H. Browne
*Assistant Examiner*—Tse Chen
(74) *Attorney, Agent, or Firm*—Quintero Law Office

(57) ABSTRACT

A selective quick boot system and method. The selective quick boot system includes a control module and a processing module with an event table. The control module receives a quick signal, provides power enabling the processing module, an event code corresponding to the quick signal is then transferred to the processing module. The processing module compares the received event code to the event table to locate a corresponding item, and drives the device recorded as the corresponding item and executes the associated application also recorded in the event table.

13 Claims, 4 Drawing Sheets

| Button # | Event Code |
|---|---|
| Button 1 | 00 |
| Button 2 | 01 |
| ⋮ | ⋮ |

| Event Code | Item |
|---|---|
| 00 | Drive Sound Card 52, CD-ROM 51, Execute Application 60 |
| 01 | |
| ⋮ | |

SELECTIVE QUICK BOOTING A PARTIAL SET OF DEVICES CORRESPONDING TO AN EVENT CODE VIA THE BIOS

BACKGROUND OF THE INVENTION

1. Field of the Invention

The present invention relates to a boot system and method, and particularly to a selective quick boot system and method that drives respective devices when a computer system is shut down without requiring hardware modification.

2. Description of the Related Art

Current computer systems including desktop personal computers and portable computers typically provide a quick button or hot key design for quick access to a specific application. In conventional computer systems the hot key is only functional if the computer is first booted. Booting the computer to utilize only one feature, however, may be considered inefficient and inconvenient as the boot process can be lengthy.

Many current computer systems provide the ability to play a CD without booting the entire system. This, however, requires an additional hardware control chip dedicated to only one function. This method is inefficient as each additional device or function requires an additional chip, thereby increasing cost, and hindering flexibility.

SUMMARY OF THE INVENTION

It is therefore an object of the present invention to provide a selective quick boot system and method that drives respective devices, and programs respective functions without requiring hardware modification.

It is another object of the present invention to provide power only to specific devices, thereby achieving the objectives of reduced power consumption, and cost, and enhancing performance and flexibility.

To achieve the above objects, the present invention provides a selective quick boot system and method. The selective quick boot system according to an embodiment of the present invention includes a control module and a processing module with an event table.

The control module receives a quick signal, provides power to enable the processing module, an event code corresponding to the quick signal is then transferred to the processing module. The processing module compares the received event code to the event table to locate a corresponding item, and drives the device recorded as the corresponding item and executes the associated application also recorded in the event table.

The control module is an embedded controller (EC). Additionally, each item in the event table records a corresponding event code, a device, an application, a work list and related parameters.

The quick boot method according to an embodiment of the present invention first provides a control module and a processing module with an event table to the computer system. The control module then receives a quick signal, provides power to enable the processing module, an event code corresponding to the quick signal is then transferred to the processing module. The processing module compares the received event code to the event table to locate a corresponding item, and drives the device recorded as the corresponding item and executes the associated application also recorded in the event table.

In a preferred embodiment, a selective quick boot system for use in a computer system is provided. The quick boot system includes a plurality of quick buttons, each corresponding to a quick signal. A control module receives one of the quick signals, provides power based on the quick signal, and transfers an event code corresponding to the quick signal. A processing module enabled by the provided power receives the event code from the control module, and before entering an operating system, compares the event code to an event table to locate a corresponding item, and drives at least a device recorded as the corresponding item, in which the device corresponds to the quick signal. In this embodiment, the processing module is a system BIOS of the computer system.

In another preferred embodiment, a selective quick boot method for use in a shut down computer system is provided. A plurality of quick buttons, each corresponding to a quick signal, are provided. Also provided are a control module and a processing module including an event table, in which the processing module is a system BIOS of the computer system. One of the quick signal signals is received by the control module. Power is provided to enable the processing module based on the quick signal, and an event code corresponding to the quick signal is transferred to the processing module by the control module. Before entering an operating system, a comparison of the event code to the event table to locate the corresponding item by the processing module is performed, and at least a device recorded as the corresponding item by the processing module is driven, in which the device corresponds to the quick signal. In a variation of this embodiment, the event code may be recorded by the control module, and the processing module may transfer a query to the control module to obtain the event code.

BRIEF DESCRIPTION OF THE DRAWINGS

The aforementioned objects, features and advantages of the invention will become apparent by referring to the following detailed description of the preferred embodiment with reference to the accompanying drawings, wherein:

FIG. 4 is an example of an event code table; and

FIG. 5 is an example of an event table.

DETAILED DESCRIPTION OF THE INVENTION

Figure 1:
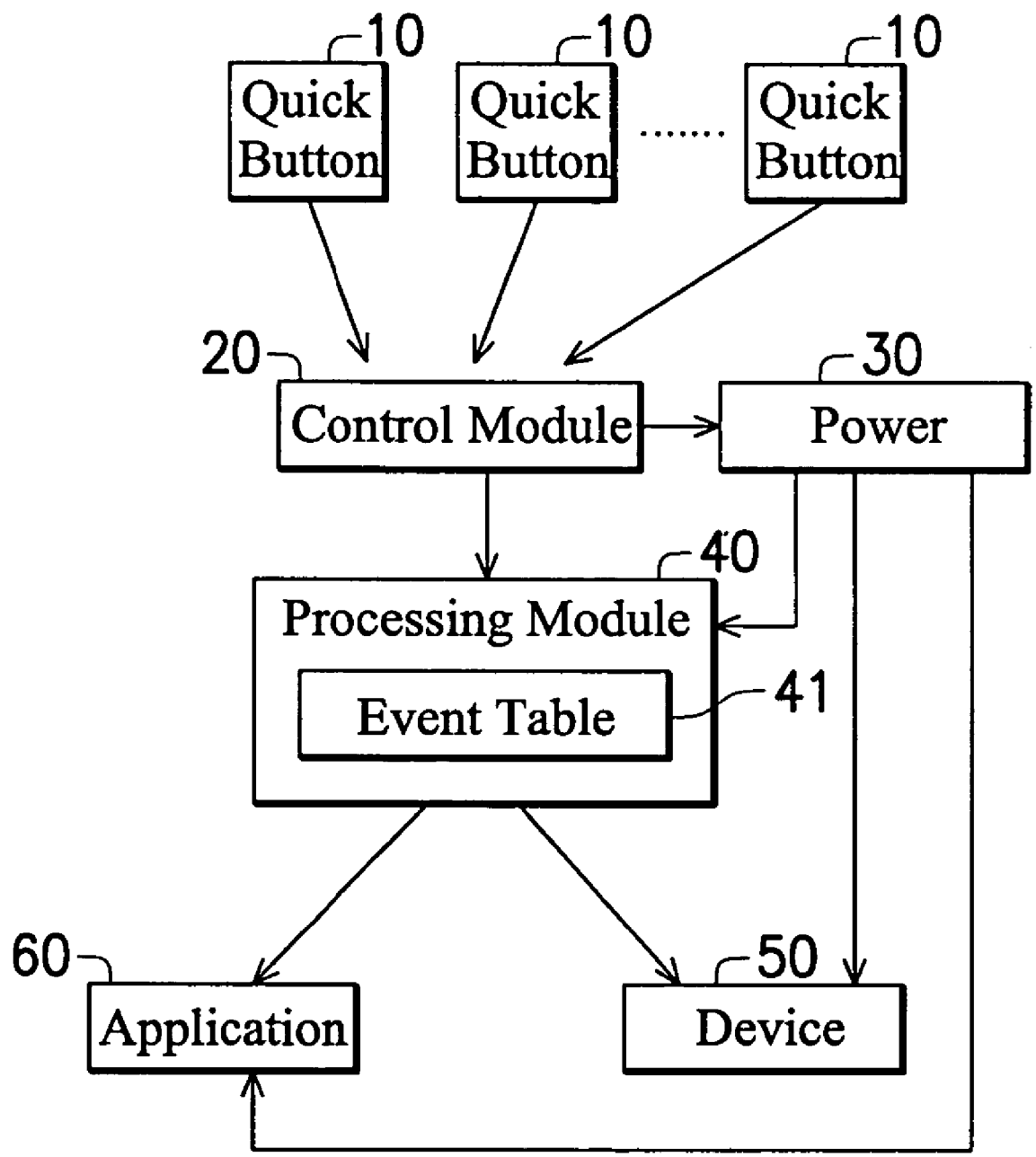
FIG. 1 is a schematic diagram illustrating the architecture of the selective quick boot system according to the embodiment of the present invention.

FIG. 1 illustrates the architecture of the selective quick boot system according to the embodiment of the present invention.

The selective quick boot system according to an embodiment of the present invention includes a control module 20 and a processing module 40 having an event table 41. The control module 20 may be an independent chip, such as an embedded controller (EC) of a desktop or notebook personal computer. The processing module 40 may be composed of the central processing unit (CPU), kernel chip sets and system basic input/output system (BIOS). The event table 41 records several items, and each item records an event code corresponding to a respective quick button, a device (or a device list including a plurality of devices), an application, a work list and related parameters.

It should be noted that even if the computer system is shut down, power 30 is still provided to the control module 20. The power 30 may also include system power directed by the control module 20, and the control module 20 may provide system power to enable the processing module 40. Additionally, if the power 30 comprises multiple power supplies, and each power supply is connected to a device 50, the processing module 40 can control the power of each device 50. The device 50 may be a display card (VGA card), sound card, hard disk, optical disc drive, and the like.

Figure 2:
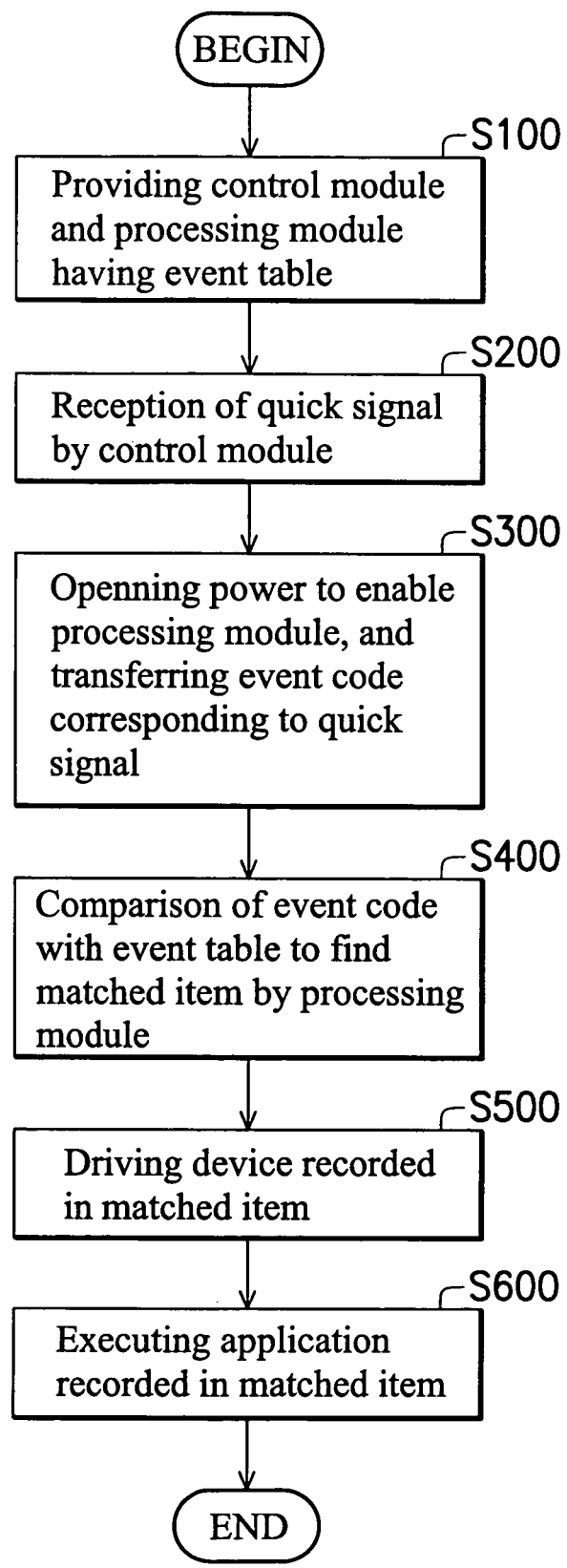
FIG. 2 is a flowchart showing the process of the quick boot method according to the embodiment of the present invention.

FIG. 2 shows the process of the quick boot method according to the embodiment of the present invention. Referring to FIGS. 1 and 2, the operation of the quick boot method according to the embodiment of the present invention is discussed as follows.

In step S100, a control module 20 and a processing module 40 having an event table 41 are provided. In step S200, the control module 20 receives a quick signal from the quick button 10. The computer system may have a plurality of quick buttons 10, in which the quick button 10 may be a key, a combination of keys, or an independent button. It is understood that the quick button 10 may be set on a keyboard of the computer system, a remote controller controlling the computer system, or any input device of the computer system. Each quick button 10 represents a function, and each quick button 10 corresponds to a quick signal.

In step S300, the control module 20 opens and provides power 30 enabling the processing module, an event code corresponding to the quick signal is then transferred to the processing module 40. It should be noted that the control module 20 may include an event code table recording event codes corresponding to respective quick buttons and quick signals, in which the event code may be identified to trigger a function. Therefore, the control module 20 compares the quick signal with the event code table to retrieve the corresponding event code.

If the processing module 40 receives an event code from the control module 20, in step S400, the event code is compared to the event table 41 to locate the corresponding item. Thereafter, in step S500, the processing module 40 drives a device 50 recorded as the corresponding item (matched item), and in step S600, executes an application 60 recorded as the corresponding item.

It should be noted that the application 60 may be stored in a predetermined partition of the hard disk of the computer system. Since the hard disk is also a device, if the processing module 40 wants to read or execute the application 60, the processing module 40 may provide power to drive the hard disk, and turn off it after the application 60 finishes execution. Note that if the application 60 needs to read data from the hard disk as it runs, the processing module 40 does not turn off the hard disk. Additionally, the application 60 may request related parameters from the processing module through a predetermined program protocol.

In another aspect of the invention, in step S300, the event code can be substituted by a query to the control module 20 by the processing module 40 to obtain the event code.

The system may further provide an event table 41 editing application, to insert, delete, or modify corresponding functions. Moreover, if it is necessary for the application 60 to read data from the hard disk, the data may be read in advance and stored in processing module 40 memory (not shown), thus the hard disk can be shut down, thereby reducing power consumption.

Figure 3:
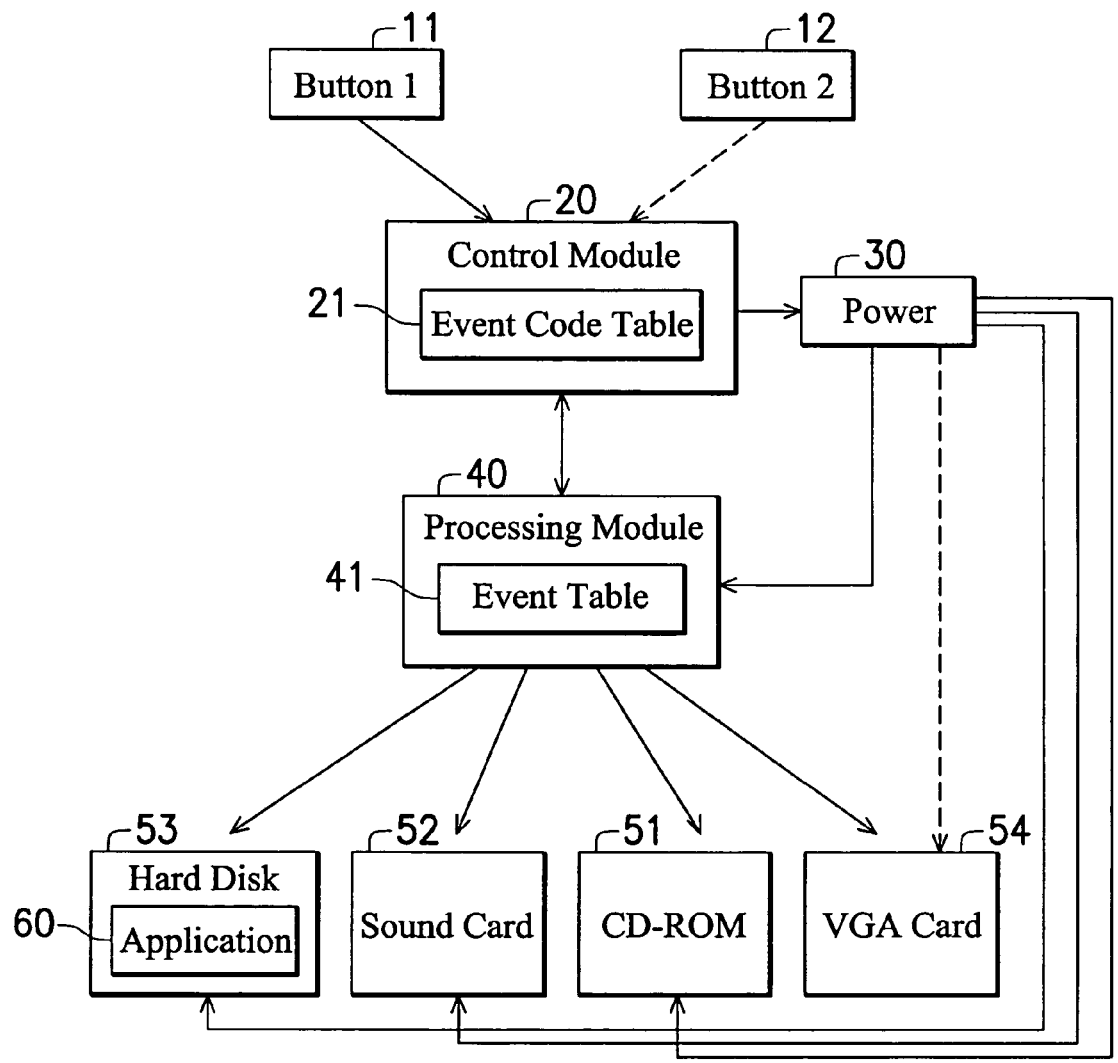
FIG. 3 is a schematic diagram illustrating playing an optical disc, such as a compact disc (CD) without booting the entire computer system.

FIG. 3 is a schematic diagram illustrating playing a music disc, such as CD (compact disc) without booting the entire computer system.

The button 1 (11) is first pressed. Once the button 1 is pressed, a quick signal is transferred to the control module 20. Note that buttons 1 (11) and 2 (12) are different quick buttons corresponding to different functions. The control module 20 then receives a quick signal from the button 1 (11), and provides power 30 to drive the processing module 40.

The control module 20 then retrieves the event code table 21 to locate the event code corresponding to the quick signal. FIG. 4 is an example of the event code table 21. In the event code table 21, the event code corresponding to the quick signal of the button 1 (11) is "00", the event code corresponding to the quick signal of the button 2 (12) is "01". Once the event code "00" is retrieved, the control module 20 transfers it to the processing module 40.

Thereafter, the processing module 40 compares the received event code "00" to the event table 41 to find the matched item. FIG. 5 is an example of the event table 41. In the event table 41, the item corresponding to the event code "00" is "Drive Sound Card 52, CD-ROM Drive 51, and Execute Application 60". The processing module 40 then provides power 30 to the CD-ROM drive 51, the sound card 52 and the hard disk 53, loads the application 60 from the hard disk 53 to the main memory (not shown), and executes the application 60.

Therefore, the application 60 plays the CD, and the processing module 40 turns off the hard disk 53. At the same time, the VGA card 54 and the hard disk 53 are also shut down. Similarly, if the application 60 needs to read data from the hard disk 53, the hard disk 53 remains on.

The selective quick boot system and method of the present invention is capable of driving individual devices and providing specific functions without booting the entire computer system and does not require any hardware modification. Additionally, the present invention selectively provides power only to specific devices, thereby achieving the objectives of reduced power consumption and cost and enhanced performance and flexibility.

Although the present invention has been described in its preferred embodiments, it is not intended to limit the invention to the precise embodiments disclosed herein. Those skilled in this technology can still make various alterations and modifications without departing from the scope and spirit of this invention. Therefore, the scope of the present invention shall be defined and protected by the following claims and their equivalents.

What is claimed is:

1. A selective quick boot system, for use in a computer system comprising an operating system and a plurality of devices, the selective quick boot system comprising:

a plurality of quick buttons, each quick button generating a unique quick signal;

a control module configured to receive the quick signals, the control module generating a unique event code corresponding to a received quick signal; and a processing module implemented in a system BIOS of the computer system and including an event table recording a partial set of the plurality of devices corresponding to each event code, the processing module configured to receive the event code generated by the control module, compare the received event code with the event table, and provide power to the partial set of devices corresponding to the received event code referenced in the event table, without entering into the operating system;

wherein the processing module is powered by the control module when the quick signal is received, and the devices excepting the partial set of devices corresponding to the received event code referenced in the event table are not provided with power after the computer system is booted.

2. The system as claimed in claim 1 wherein the event table further records an application corresponding to each of a plurality of event codes, and the processing module further executes the application corresponding to the received event code.

3. The system as claimed in claim 1 wherein the quick buttons are set on a keyboard of the computer system.

4. The system as claimed in claim 1 wherein the quick buttons are set on a remote controller controlling the computer system.

5. The system as claimed in claim 2 wherein the application is stored in a predetermined partition.

6. A selective quick boot method, for use in a shut down computer system comprising an operating system, a plurality of devices, a plurality of quick buttons generating quick signals, a control module configured to receive the quick signals, and a processing module implemented in a system BIOS of the computer system and including an event table recording a partial set of the plurality of devices corresponding to each of a plurality of event code, the selective quick boot method comprising the steps of:

generating a quick signal by one of the plurality of quick buttons;

receiving the quick signal by the control module;

transferring an event code corresponding to the received quick signal to the processing module and providing power to enable the processing module by the control module;

comparing the received event code to the event table by the processing module; and providing power to the partial set of the plurality of devices corresponding to the received event code;

wherein the devices excepting the partial set of devices corresponding to the received event code referenced in the event table are not provided with power after the computer system is booted, and the steps of comparing and providing power to the partial set of the plurality of devices are performed without entry into the operating system.

7. The method as claimed in claim 6, wherein the event table further records an application corresponding to each of a plurality of event codes, the method further comprising a step of executing the application corresponding to the received event code by the processing module.

8. The method as claimed in claim 7 wherein the application is stored in a predetermined partition.

9. The method as claimed in claim 6 wherein the quick buttons are set on a keyboard of the computer system or a remote controller controlling the computer system.

10. A selective quick boot method, for use in a computer system comprising an operating system, a plurality of devices, a plurality of quick buttons generating quick signals, a control module configured to receive the quick signals, and a processing module implemented in a system BIOS of the computer system and including an event table recording a partial set of the plurality of devices corresponding to each of a plurality of event codes, the selective quick boot method comprising the steps of:

generating a quick signal by one of the plurality of quick buttons;

receiving the quick signal by the control module;

recording an event code corresponding to the received quick signal and providing power to enable the processing module by the control module;

querying the control module by the processing module to obtain the recorded event code;

comparing the received event code to the event table by the processing module; and providing power to the partial set of the plurality of devices corresponding to the recorded event code;

wherein the devices excepting the partial set of devices corresponding to the received event code referenced in the event table are not provided with power after the computer system is booted, and the steps of comparing and providing power to the partial set of the plurality of devices are performed without entry into the operating system.

11. The method as claimed in claim 10, wherein the event table further records an application corresponding to each of a plurality of event codes, the method further comprising a step of executing the application corresponding to the received event code by the processing module.

12. The method as claimed in claim 11 wherein the application is stored in a predetermined partition.

13. The method as claimed in claim 10 wherein the quick buttons are set on a keyboard of the computer system or a remote controller controlling the computer system.

* * * * *